United States Patent [19]
Pickett

[11] Patent Number: 6,088,781
[45] Date of Patent: *Jul. 11, 2000

[54] STRIDE INSTRUCTION FOR FETCHING DATA SEPARATED BY A STRIDE AMOUNT

[75] Inventor: James K. Pickett, Austin, Tex.

[73] Assignee: Advanced Micro Devices, Inc., Sunnyvale, Calif.

[ * ] Notice: This patent is subject to a terminal disclaimer.

[21] Appl. No.: 09/305,936

[22] Filed: May 6, 1999

Related U.S. Application Data

[63] Continuation of application No. 08/831,195, Apr. 2, 1997, Pat. No. 5,940,876.

[51] Int. Cl.⁷ .................................................. G06F 9/32
[52] U.S. Cl. .................... 711/213; 711/212; 711/215; 711/218; 711/219; 711/220
[58] Field of Search ..................... 711/118, 137, 711/204, 213, 215, 217, 218, 219, 220, 3, 212

[56] References Cited

U.S. PATENT DOCUMENTS

| | | | |
|---|---|---|---|
| 5,357,618 | 10/1994 | Mirza et al. ................................ | 711/3 |
| 5,699,277 | 12/1997 | Munson et al. .......................... | 345/434 |
| 5,760,497 | 6/1998 | Pascucci .................................. | 307/110 |
| 5,760,794 | 6/1998 | Munson et al. .......................... | 307/110 |
| 5,777,624 | 7/1998 | Munson .................................... | 345/431 |
| 5,809,552 | 9/1998 | Kuroiwa et al. ......................... | 711/169 |

OTHER PUBLICATIONS

Bunda, John, Terence Potter, & Robert Shadowen, *PowerPC Microprocessor Developer's Guide*, Sam's Publishing, Indianapolis, IN, 1995.

*Pentium Processor User's Manual Volume: 3 Architecture & Programming Manual*, Intel, 1993.

*Primary Examiner*—Do Hyun Yoo
*Assistant Examiner*—T Nguyen
*Attorney, Agent, or Firm*—Conley, Rose & Tayon, P.C.; Lawrence J. Merkel

[57] ABSTRACT

A microprocessor is configured to execute a stride instruction. In response to the stride instruction, the microprocessor performs a series of load memory operations. The address corresponding to a particular load memory operation is the sum of a stride operand of the stride instruction and the address corresponding to another load memory operation immediately preceding the particular load memory operation in the series. A base address operand specifies the address of the first load memory operation in the series, and a repetition count operand specifies the number of load memory operations in the series. The cache lines corresponding to the series of load memory operations (i.e. the cache lines storing the bytes addressed by the load memory operations) are fetched into the data cache of the microprocessor in response to the series of load memory operations.

19 Claims, 7 Drawing Sheets

Non-Stride 62

Repetition Count = 0 OR Reset

Stride Instruction Received

Stride 64

MOV1 xxx,ESI ← 72A

ADD ESI, EDX ← 74A

MOV1 xxx,ESI ← 72B

ADD ESI, EDX ← 74B

⋮

ADD ESI, EDX ← 74M

MOV1 xxx,ESI ← 72N

STRIDE INSTRUCTION FOR FETCHING DATA SEPARATED BY A STRIDE AMOUNT

This application is a continuation of U.S. patent application Ser. No. 08/831,195, filed on Apr. 2, 1997, now U.S. Pat. No. 5,940,876.

BACKGROUND OF THE INVENTION

1. Field of the Invention

This invention relates to the field of microprocessors and, more particularly, to mechanisms for fetching data into microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Superscalar microprocessors demand high memory bandwidth due to the number of instructions executed concurrently and due to the increasing clock frequency (i.e. shortening clock cycle) employed by the superscalar microprocessors. Many of the instructions include memory operations to fetch (read) and update (write) memory operands in addition to the operation defined for the instruction. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to relieve the bandwidth requirements on the memory system (or alternatively to increase the number of instructions executable per clock cycle given a fixed amount of available bandwidth), microprocessors typically employ one or more caches to store the most recently accessed data and instructions. Many programs have memory access patterns which exhibit locality of reference, particularly for data (e.g. memory operands used by instructions). A memory access pattern exhibits locality of reference if a memory operation to a particular byte of main memory indicates that memory operations to other bytes located within the main memory at addresses near the address of the particular byte are likely. Generally, a "memory access pattern" is a set of consecutive memory operations performed in response to a program or a code sequence within a program. The addresses of the memory operations within the memory access pattern may have a relationship to each other. For example, the memory access pattern may or may not exhibit locality of reference.

When programs exhibit locality of reference, cache hit rates (i.e. the percentage of memory operations for which the requested byte or bytes are found within the caches) are high and the bandwidth required from the main memory is correspondingly reduced. When a memory operation misses in the cache, the cache line (i.e. a block of contiguous data bytes) including the accessed data is fetched from main memory and stored into the cache. A different cache line may be discarded from the cache to make room for the newly fetched cache line.

Unfortunately, certain code sequences within a program may have a memory access pattern which does not exhibit locality of reference. More particularly, code sequences may access a sequence of data stored at addresses separated by a fixed stride from each other (a "strided memory access pattern"). In other words, a first datum may be accessed at a first address; subsequently, a second datum may be accessed at a second address which is the sum of the fixed stride and the first address; subsequently, a third datum may be accessed at a third address which is the sum of the fixed stride and the second address; etc.

Figure 1:
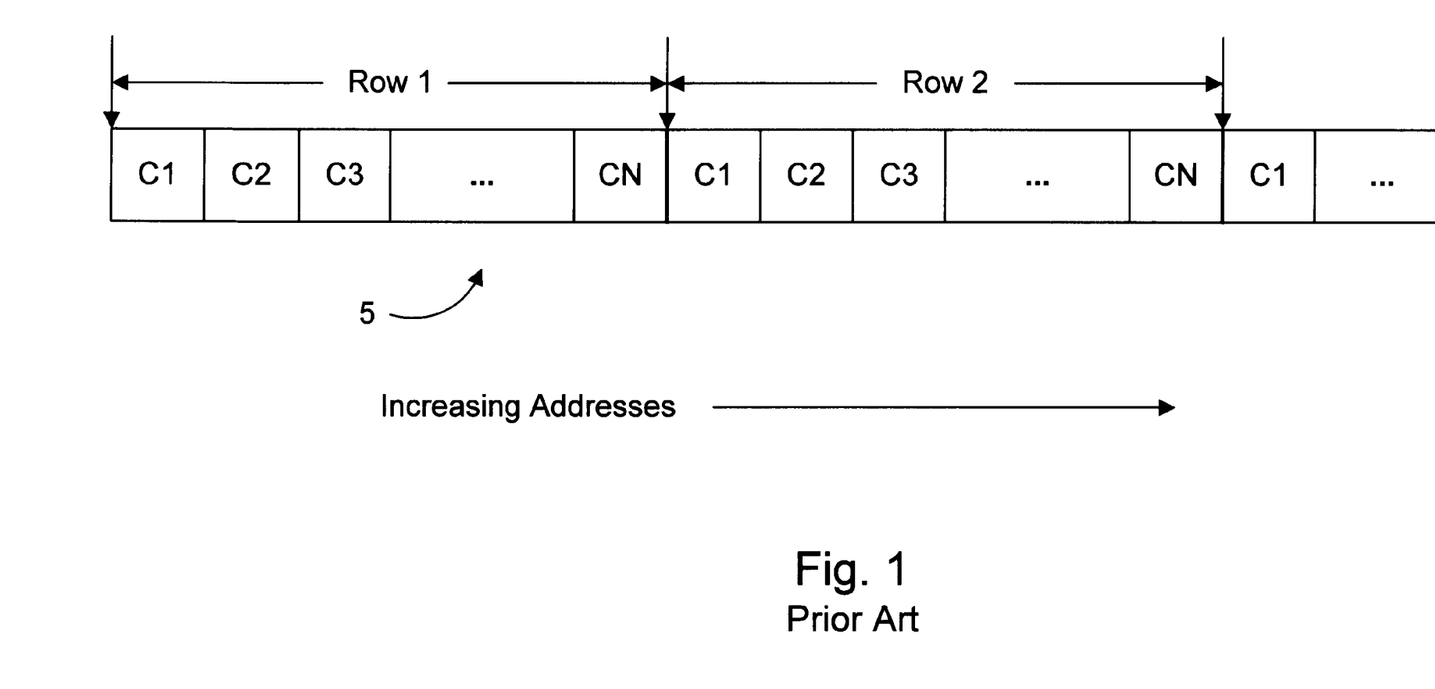
FIG. 1 is a diagram illustrating storage of a two dimensional array of values in a memory.
Figure 2:
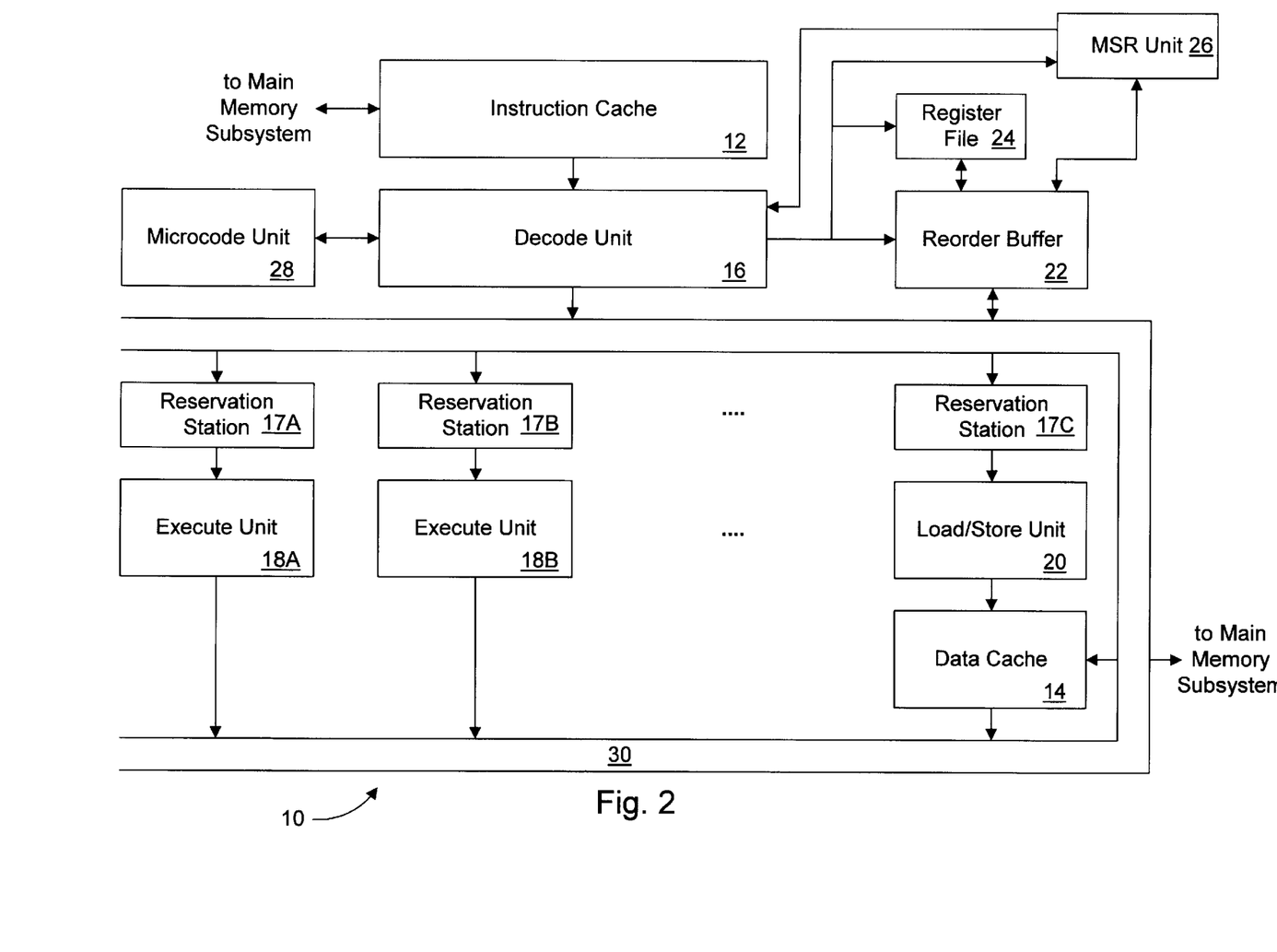
FIG. 2 is a block diagram of one embodiment of a microprocessor.

The strided memory access pattern may occur when a code sequence accesses many common data structures. For example, FIG. 1 illustrates a memory 5 in which a two dimensional array of data is stored. In FIG. 1, data stored at larger numerical addresses is shown to the right of data stored at smaller numerical addresses. In a two dimensional array, data is organized into rows and columns. A given datum is located in the array by specifying its row and column number. The storage of the first and second rows of the array within memory 5 is depicted in FIG. 1. Each row comprises elements stored in columns 1 through N (C1 through CN). Each element C1–CN may occupy one or more bytes, and may be different in size from each other. The elements of each row are stored in contiguous memory locations, and the last element (CN) of the first row is stored in a memory location contiguous to the first element of the second row (C1). The arrangement shown in FIG. 2 is often referred to as the "row major" representation of a two dimensional array. The "column major" representation has each element within a given column stored in contiguous memory locations.

For the row major representation of the array, accessing each of the elements of a given column of the array in succession comprises a strided memory access pattern. For example, each of the C2 elements of the rows of the array are separated within memory by the number of bytes occupied by one row of the array. In the column major representation of the array, accessing each of the elements of a given row of the array in succession comprises a strided memory access pattern. Furthermore, accessing any multi-dimensional array (2 dimensional, 3 dimensional, etc.) exhibits a strided memory access pattern when the elements stored in any one of the axes of the array is traversed.

If the fixed stride manifested by the strided memory access pattern is larger than a cache line, each subsequent access may miss the data cache unless the cache line containing the subsequent access was previously cached. Performance of the code sequence may suffer due to the low cache hit rates associated with the code sequence.

SUMMARY OF THE INVENTION

The problems outlined above are in large part solved by a microprocessor in accordance with the present invention The microprocessor is configured to execute a stride instruction. In response to the stride instruction, the microprocessor performs a series of load memory operations. The address corresponding to a particular load memory operation is the sum of a stride operand of the stride instruction and the address corresponding to another load memory operation immediately preceding the particular load memory operation in the series. A base address operand specifies the address of the first load memory operation in the series, and a repetition count operand specifies the number of load memory operations in the series. The cache lines corresponding to the series of load memory operations (i.e. the cache lines storing the bytes addressed by the load memory operations) are fetched into the data cache of the microprocessor in response to the series of load memory operations.

The stride instruction may be executed prior to a code sequence which exhibits a strided memory access pattern. Advantageously, the memory operations performed by the code sequence may achieve a higher cache hit rate because the cache lines within the strided memory access pattern have been fetched into the data cache. The increased cache hit rate experienced by the code sequence may result in increased execution efficiency (e.g. the average number of instructions executed per clock cycle) of the microprocessor for the code sequence. Overall execution efficiency of the microprocessor for the program including the code sequence may by increased accordingly.

Broadly speaking, the present invention contemplates a microprocessor comprising a decode unit and a second unit. The decode unit is coupled to receive and decode a stride instruction. Coupled to receive the stride instruction from the decode unit, the second unit is configured to perform a first load memory operation and a second load memory operation in response to the stride instruction. The second unit is configured to form a first address corresponding to the first load memory operation from at least a base address operand of the stride instruction. Additionally, the second unit is configured to form a second address corresponding to the second load memory operation by adding the first address to a stride operand of the stride instruction.

The present invention further contemplates a method for efficiently accessing data stored at a plurality of addresses, wherein a difference between each one of the plurality of addresses and a succeeding one of the plurality of addresses is a fixed stride. A stride instruction is executed in a microprocessor. The stride instruction specifies a first one of the plurality of addresses and the fixed stride via a plurality of operands of the stride instruction. A plurality of load memory operations is performed within the microprocessor in response to the stride instruction. Each one of the plurality of load memory operations corresponds to one of the plurality of addresses.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 2, a block diagram of one embodiment of a microprocessor 10 is shown. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a model specific register (MSR) unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 2. Additionally, an embodiment of microprocessor 10 may include one execute unit 18.

As shown in FIG. 2, instruction cache 12 is coupled to a main memory subsystem (not shown) and to a decode unit 16, which is further coupled to reservation stations 17, reorder buffer 22, register file 24, MSR unit 26, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Finally, MSR unit 26 and register file 24 are coupled to reorder buffer 22.

Generally speaking, microprocessor 10 is configured to execute a stride instruction. In response to the stride instruction, microprocessor 10 performs multiple load memory operations. The stride instruction includes a base address operand, a stride operand, and a repetition count operand. The first of the multiple load memory operations is performed using the base address operand. Each subsequent load memory operation is performed to a memory address formed by adding the stride operand to the memory address accessed by the immediately preceding load memory operation. The repetition count operand specifies the total number of load memory operations performed in response to the stride instruction. Data cache 14 is accessed by load/store unit 20 for each load memory operation (similar to the operation of other load memory operations performed in response to other instructions). If the load memory operations miss data cache 14, the cache lines containing the bytes addressed by the missing load memory operations are fetched into data cache 14. Upon completion of the stride instruction, each of the cache lines storing the bytes addressed by the load memory operations performed in response to the stride instruction are stored in data cache 14.

The stride instruction may be used prior to initiation of a code sequence which exhibits a strided memory access pattern. The stride instruction causes the cache lines storing the data to be accessed to be fetched into data cache 14. When the code sequence executes, many of the memory operations performed by the code sequence may hit in data cache 14 since the addressed cache lines were fetched in response to the previously executed stride instruction. Performance of microprocessor 10 while executing the code sequence may be increased due to the increased cache hit rate of the memory operations within the code sequence.

In one embodiment, microprocessor 10 is configured to reassign the operation performed by a given instruction when an instruction redefinition mode is enabled. The reassigned operation comprises the operation performed by the stride instruction. Microprocessor 10 employs a model specific register (MSR) within MSR unit 26 for storing an indication that the stride instruction operation is selected as the operation for the redefinable instruction. Using a write MSR instruction, an application program can redefine an instruction to perform a stride instruction operation. Advantageously, the stride instruction can be added to the instruction set without consuming the undefined opcodes (if any) within that instruction set. Furthermore, the stride instruction can be added to an instruction set in which all of the opcodes have been consumed. It is noted that, according to another embodiment multiple redefinable instructions may be preselected. The value in the MSR may indicate which of the multiple redefinable instructions is selected by the application program to be the stride instruction.

Decode unit 16 is coupled to receive signals from MSR unit 26 which represent the instruction redefinitions. For each instruction which microprocessor 10 allows to be redefined, decode unit 16 produces a first decoded instruction which causes execute units 18 and/or load/store unit 20 to perform the architecturally defined operation assigned to the instruction if the signals indicate that the instruction has not been redefined via an update to the corresponding MSR. Alternatively, decode unit 16 produces a second decoded instruction which causes execute units 18 and/or load/store unit 20 to perform a stride instruction if the signals indicate that the instruction has been redefined via an update to the corresponding MSR. According to one embodiment, instruction redefinition is enabled via a redefinition enable flag stored in a status flags register. If the redefinition enable flag is not set, then the signals from MSR unit 26 are ignored by decode unit 16 and decode unit 16 produces the first decoded instruction. Alternatively, execute units 18 may be coupled to receive the signals from MSR unit 26 and may change execution of the instruction in response to those signals.

MSR unit 26 comprises a plurality of model specific registers. Generally speaking, model specific registers are used to control features which are part of the implementation of microprocessor 10 but which are not part of the microprocessor architecture employed by microprocessor 10. For example, debug features supported by microprocessor 10 may be controlled by model specific registers. Additionally, performance monitoring features may be controlled via model specific registers. According to the present embodiment of microprocessor 10, a model specific register is assigned to store instruction redefinition controls.

According to one embodiment, microprocessor 10 employs the x86 microprocessor architecture. The x86 microprocessor architecture employs MSRs, with a RDMSR instruction for reading the MSRs and a WRMSR instruction for writing the MSRs. The RDMSR and WRMSR instructions are defined as privileged instructions in the x86 microprocessor architecture. Microprocessor 10, on the other hand, does not treat the RDMSR and WRMSR instructions as privileged if the MSR being updated is the MSR which stores instruction redefinition information. If that MSR is being updated or read, the WRMSR or RDMSR instruction is executed as non-privileged. Otherwise, the instruction is executed as privileged. Although the x86 microprocessor architecture is employed by one embodiment of microprocessor 10, other embodiments may employ different microprocessor architectures.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 3:
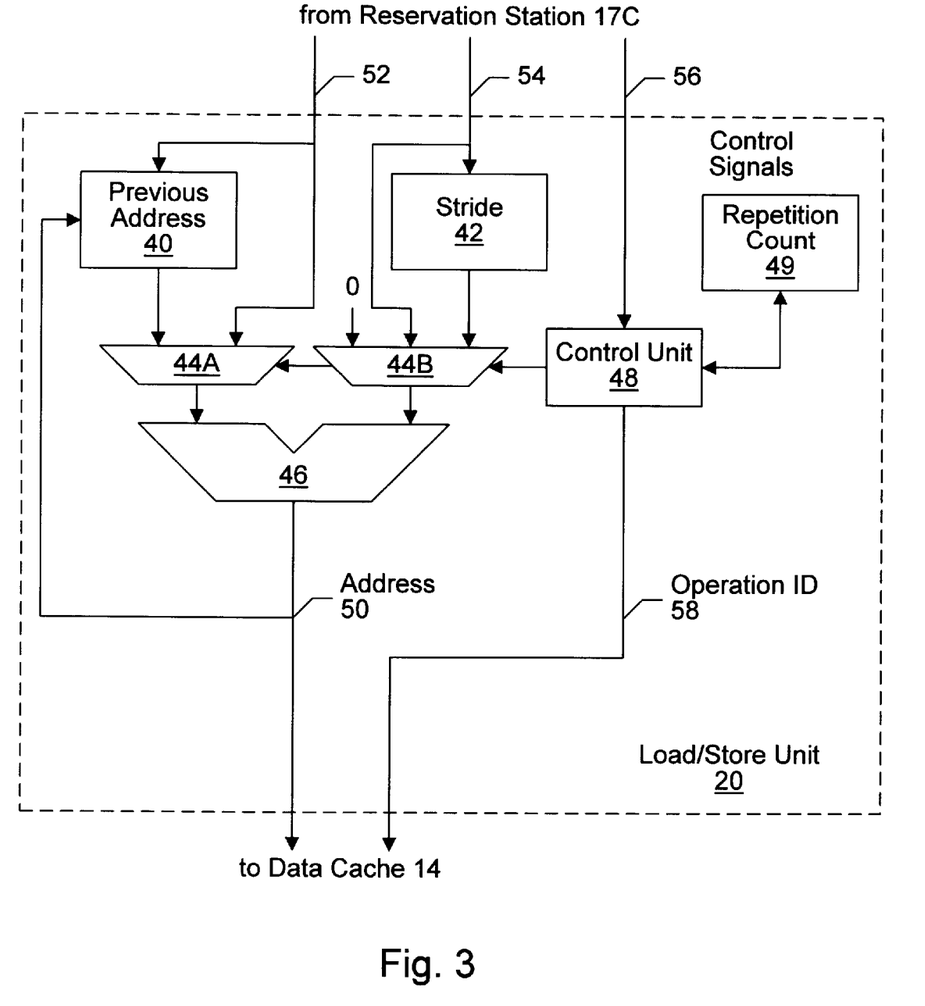
FIG. 3 is a block diagram of one embodiment of a load/store unit shown in FIG. 2.

Turning next to FIG. 3, a block diagram of one embodiment of load/store unit 20 is shown. The embodiment shown in FIG. 3 may be employed by one embodiment of microprocessor 10 which supports the stride instruction. Other implementations are contemplated as well, including embodiments in which the hardware for performing stride instructions is separate from load/store unit 20 and embodiments which support the stride instruction via a microcode sequence within microcode unit 28. As illustrated in FIG. 3, load/store unit 20 includes a previous address register 40, a stride register 42, a set of multiplexors 44A and 44B, an adder 46, a control unit 48, and a repetition count register 49. Adder 46 is coupled to receive addition operands from multiplexors 44A and 44B, and provides the addition result upon an address bus 50 which is coupled to data cache 14. Additionally, address bus 50 is coupled to previous address register 40. Previous address register 40 is coupled as an input to multiplexor 44A, and is further coupled to receive a base address operand upon a base address operand bus 52 from reservation station 17C. Base address operand bus 52 is further coupled as a second input to multiplexor 44A. Similarly, stride register 42 is coupled as an input to multiplexor 44B, and is further coupled to receive a stride operand upon a stride operand bus 54 from reservation station 17C. Additionally, stride operand bus 54 is coupled as a second input to multiplexor 44B. Multiplexors 44A and 44B receive selection controls from control unit 48, which is coupled to a control signals bus 56 from reservation station 17C and an operation ID bus 58 which is coupled to data cache 14. Still further, control unit 48 is coupled to repetition count register 49.

Generally speaking, load/store unit 20 is configured to perform stride instructions using adder 46, multiplexors 44A and 44B, previous address register 40, and stride register 42. Decode unit 16 routes stride instructions (as well as load and store memory operations) to reservation station 17C. Upon selecting the stride instruction for execution (e.g. all operands of the stride instruction have been provided), reservation station 17C conveys the base address operand of the stride instruction on base address bus 52, the stride operand upon stride operand bus 54, and the repetition count operand upon control signals bus 56. Additionally, a control signal upon control signals bus 56 is asserted to indicate that a stride instruction is being conveyed.

In response to the stride instruction, control unit 48 causes the value upon base address operand bus 52 to be selected by multiplexor 44A and a constant zero to be selected by multiplexor 44B. In this manner, the base address provided by the base address operand is formed by adder 46 and conveyed upon address bus 50. Additionally, control unit 48 indicates that a load memory operation is being performed via operand ID bus 58. Control unit 48 decrements the repetition count operand by one and stores the resulting value in repetition count register 49. Additionally, previous address register 40 stores the base address operand and stride register 42 stores the stride operand.

During succeeding clock cycles, control unit 48 conveys additional load memory operations to data cache 14. In order to generate the addresses for the additional load memory operations, control unit 48 causes multiplexor 44A to select the contents of previous address register 40 and multiplexor 44B to select the contents of stride register 42. An address which differs from the previous address by the stride amount stored in stride register 42 is thereby generated. Additionally, previous address register 40 captures the address generated by adder 46 for use in generating the address for a subsequently generated load memory operation. Via operation ID bus 58, control unit 48 indicates to data cache 14 that each of the memory operations generated in the above manner are load memory operations. A series of load memory operations having corresponding addresses separated by a fixed stride amount are thereby generated by load/store unit 20.

Control unit 48 decrements the repetition count stored in repetition count register 49 upon generating each load memory operation performed in response to the stride instruction. When the repetition count reaches zero, the stride instruction is complete within load/store unit 20. Load/store unit 20 is then prepared to accept a subsequent instruction. It is noted that control unit 48 may emit a busy signal (not shown) received by reservation station 17C, in order to delay subsequent instructions until the current instruction is complete.

Data cache 14 responds to the load memory operations generated in response to the stride instruction in the same fashion as it responds to other load memory operations. In other words, cacheable load memory operations which miss data cache 14 cause the cache line including the byte addressed by the missing load memory operation to be transferred from main memory into data cache 14. Cacheable load memory operations which hit data cache 14 do not alter which cache lines are stored in data cache 14. According to one embodiment, the stride instruction does not specify a destination operand. Therefore, data cache 14 does not forward the data read by the load memory operation to a destination storage location. In this manner, the cache lines referenced by the stride instruction are transferred into data cache 14 (if not already stored therein), but no destination storage locations (e.g. registers within register file 24) are altered.

Load/store unit 20 may perform load memory operations which are not in response to a stride instruction and store memory operations using adder 46, multiplexor 44A, and multiplexor 44B as well. Address operands may be conveyed by reservation station 17C upon base operand bus 52 and stride operand bus 54 to load/store unit 20. Additionally, control signals upon control signals bus 56 indicate that a memory operation other than a stride instruction is being conveyed, as well as the load/store nature of the memory operation. Control unit 48 selects the values upon buses 52 and 54 through multiplexors 44A and 44B, respectively, for providing inputs to adder 46. The address for the memory operation is thereby formed. Via operand ID bus 58, control unit 48 identifies the memory operation as either a load or a store in accordance with the corresponding indications from reservation station 17C.

According to another embodiment, load/store unit 20 may employ a separate adder from adder 46 for performing load and store memory operations which are not the result of a stride instruction. This type of embodiment may be used to allow instructions subsequent to the stride instruction which reference memory operands to perform memory operations in parallel with the execution of memory operations in response to the stride instruction. Such an embodiment is coupled with an embodiment of data cache 14 which is configured to perform multiple memory operations in a particular clock cycle. Still further, a fetch unit (not shown) separate from load/store unit 20 may be employed for performing stride instructions. The fetch unit may be configured similar to FIG. 3. In yet another embodiment, address generation may be performed by execute units 18 and load/store unit 20 may be used to initiate the memory operations to data cache 14.

It is noted that, in one embodiment, control unit 48 may be configured to detect stride operands which are smaller than a cache line size employed by data cache 14. Control unit 48 may cause load/store unit 20 to perform one load memory operation per cache line (instead of performing several load memory operations per cache line by iteratively adding the stride operand to the previously generated address). In such an embodiment, fewer load memory operations may be generated than the repetition count operand specifies for cases in which the stride operand is smaller than the cache line size. However, all cache lines that would be accessed by the stride instruction (if each of the load memory operations specified by the stride operand and repetition count operand were performed) are fetched into data cache 14. The result of executing one load memory operation per cache line is therefore the same as if each of the specified load memory operations were generated, but the execution of the stride instruction is more efficient because fewer actual load memory operations are generated.

It is noted that, by adding a bus connected between multiplexor 44B and reservation station 17C (in place of stride operand bus 54), the base address operand may be specified as the addition of two operands provided by the stride instruction. Furthermore, additional operands may be supported by adding inputs to adder 46. Generally, the base address operand may be specified by one operand or the additive combination of two or more operands of the stride instruction. It is further noted that, in embodiments of microprocessor 10 employing the x86 microprocessor architecture, a segment base address is added to the address operands of an instruction to produce a linear address. According to one embodiment, adder 46 may include an input for the segment base address.

Figure 4:
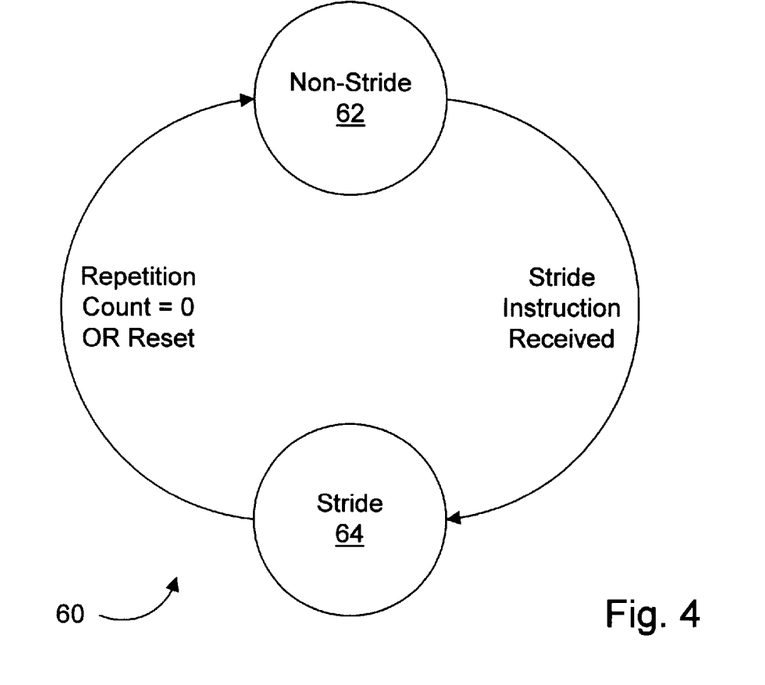
FIG. 4 is an exemplary state machine which may be employed by the load/store unit shown in FIG. 3.

Turning now to FIG. 4, an exemplary state machine 60 is shown which may be employed by one embodiment of control unit 48. During a non-stride state 62, control unit 48 selects the values conveyed upon operand buses 52 and 54 via multiplexors 44A and 44B for adding in adder 46. Load and store memory operations which are not the result of a stride instruction are thereby performed.

State machine 60 transitions from non-stride state 62 to a stride state 64 upon receipt of a stride instruction. Additionally, control unit 48 selects the base address through multiplexor 44A, the constant zero through multiplexor 44B, and decrements the received repetition count by one. The resulting repetition count is stored in repetition count register 49.

During stride state 64, control unit 48 selects the contents of previous address register 40 and stride register 42 through multiplexors 44A and 44B, respectively. Multiple load memory operations to addresses separated by the stride operand of the stride instruction are thereby generated. Additionally, each time a load memory operation is generated while state machine 60 is in stride state 64, control unit 48 decrements the repetition count. When the repetition count equals zero, state machine 60 transitions to non-stride state 62. In this manner, the total number of load memory operations generated in response to the stride instruction is equal to the repetition count.

It is noted that, when microprocessor 10 is reset (e.g. when the computer system including microprocessor 10 is booted), state machine 60 initializes to non-stride state 62. The arc illustrating the transition from stride state 64 to non-stride state 62 therefore include the reset condition as well as the zero repetition count condition.

Figure 5:
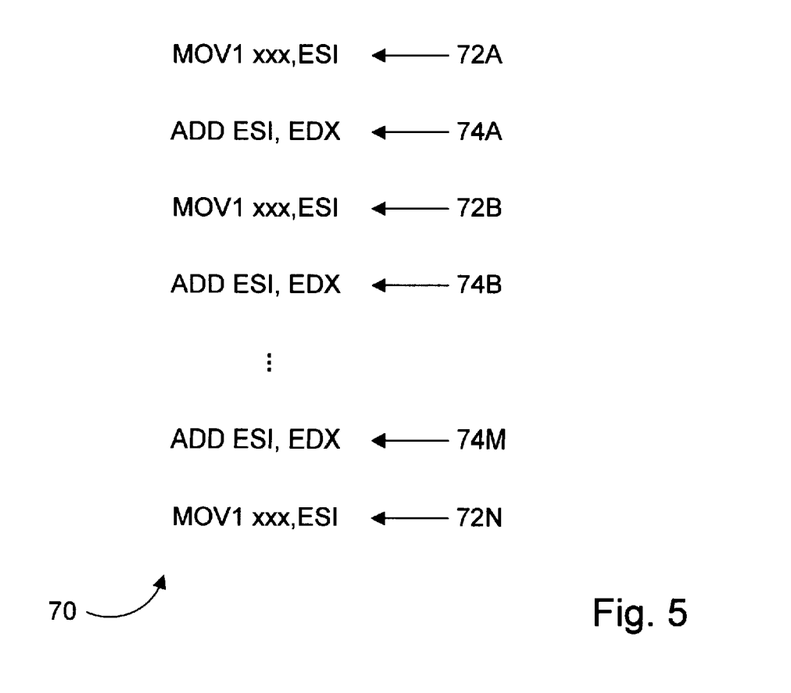
FIG. 5 is an exemplary microcode sequence which may be produced by a microcode unit shown in FIG. 2.

Turning next to FIG. 5, an exemplary microcode sequence 70 is shown. Microcode sequence 70 may be produced by one embodiment of microcode unit 28 in response to a stride instruction. Microcode sequence 70 may be employed by microcode unit 28 in an embodiment of microprocessor 10 which implements the stride instruction in microcode instead of within load/store unit 20 or a fetch unit (as described above with respect to FIGS. 3 and 4). Microcode sequence 70 as shown in FIG. 5 is compatible with the x86 microprocessor architecture. However, similar code sequences are contemplated for other microprocessor architectures. Microcode sequence 70 is produced when the stride instruction specifies that the base address operand as stored in the ESI register and the stride operand as stored in the EDX register. Other registers may be used to store these operands according to programmer choice.

Microcode sequence 70 includes a series of load memory operations 72A, 72B, etc., through load memory operation 72N. The total number of load memory operations 72 produced within microcode sequence 70 is equal to the repetition count operand of the stride instruction. The mnemonic MOV1 is used in FIG. 5 to indicate that the load memory operations 72A–72N differ from the load memory operation specified by the x86 instruction assigned to the mnemonic MOV. In particular, the MOV1 instruction does not specify a destination operand but is otherwise similar to the MOV instruction. In this manner, the load memory operations for the stride instruction may be performed without updating a destination operand. Advantageously, a destination operand need not be overwritten when executing the stride instruction. In another embodiment, the MOV instruction may be used.

Interspersed between each of the load memory operations 72A–72N are addition operations (e.g. add instructions) 74A, 74B, etc., through 74M. The addition operations prepare the address for the following load memory operation. For example, addition operation 74A prepares the address for load memory operation 72B, etc. The addition operations 74 are routed by decode unit 16 to one of execute units 18, while the load memory operations 72 are routed to load/store unit 20. The result computed by execute units 18 is forwarded to load/store unit 20 as well, which subsequently performs the load memory operation dependent upon the corresponding addition operation. The total number of addition operations within microcode sequence 70 is one less than the repetition count operand of the stride instruction.

Figure 6:
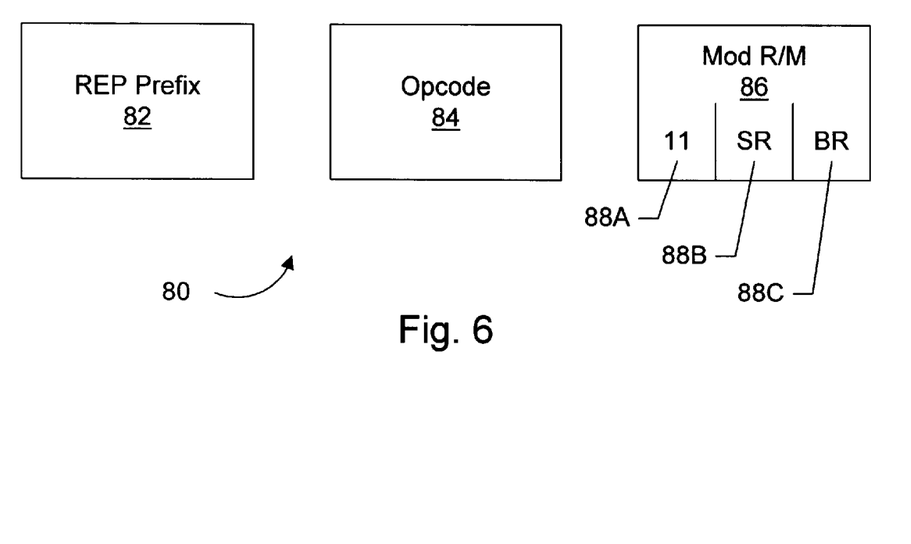
FIG. 6 is an exemplary stride instruction.

Turning next to FIG. 6, a first exemplary stride instruction 80 is shown. Stride instruction 80 is compatible with the x86 microprocessor architecture. Stride instruction 80 includes an REP prefix byte 82, an opcode byte 84, and an addressing mode byte (MOD R/M byte) 86. REP prefix byte 82 specifies that the instruction specified by opcode byte 84 is to be repeated the number of times specified in the ECX register (or the CX register, if microprocessor 10 is operating in 16 bit mode). In other words, REP prefix byte 82 specifies that the repetition count operand of stride instruction 80 is stored in the ECX (or CX) register. Opcode byte 84 specifies the stride instruction. According to one embodiment, opcode byte 84 is selected as one of the previously undefined opcode bytes of the x86 microprocessor architecture.

MOD R/M byte 86, when used within stride instruction 80, includes three fields: a mode field 88A, a stride register field 88B, and a base register field 88C. Mode field 88A is coded to a binary "11", indicating that fields 88B and 88C are both register specifiers in accordance with the x86 microprocessor architecture definition of MOD R/M byte 86 definition. Stride instruction 80 draws the stride operand from the register specified in field 88B and the base address operand from the register specified in field 88C.

Figure 7:
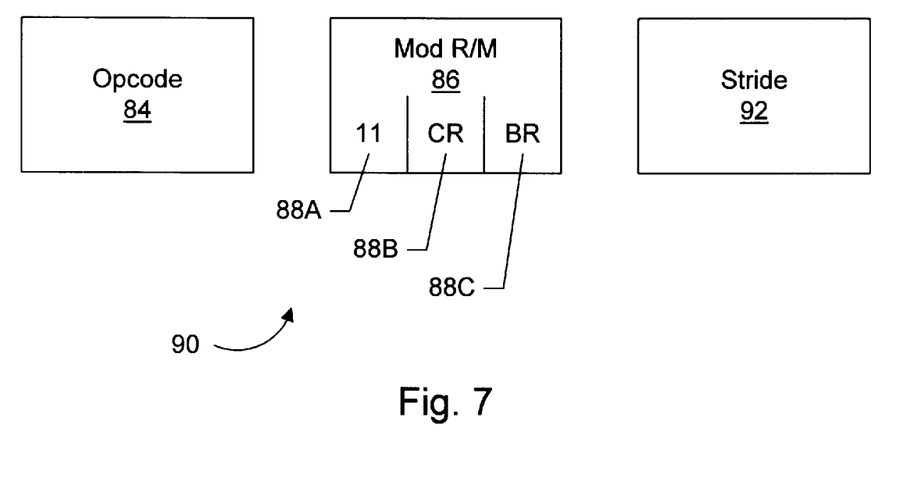
FIG. 7 is a second exemplary stride instruction.

Turning now to FIG. 7, a second exemplary stride instruction 90 is shown. Stride instruction 90 includes opcode byte 84 and MOD R/M byte 86 as well as a stride field 92. Opcode byte 84 is similar to opcode byte 84 as shown in FIG. 6. However, MOD R/M byte 86 is defined differently. Field 88A is coded to binary "11", specifying that fields 88B and 88C both specify register operands. Field 88B defines the register storing the repetition count operand, and field 88C defines the register storing the base address operand. Additionally, stride field 92 comprises an immediate field of stride instruction 90 which specifies the stride operand. Stride field 92 may comprise one or more bytes in various embodiments.

Figure 8:
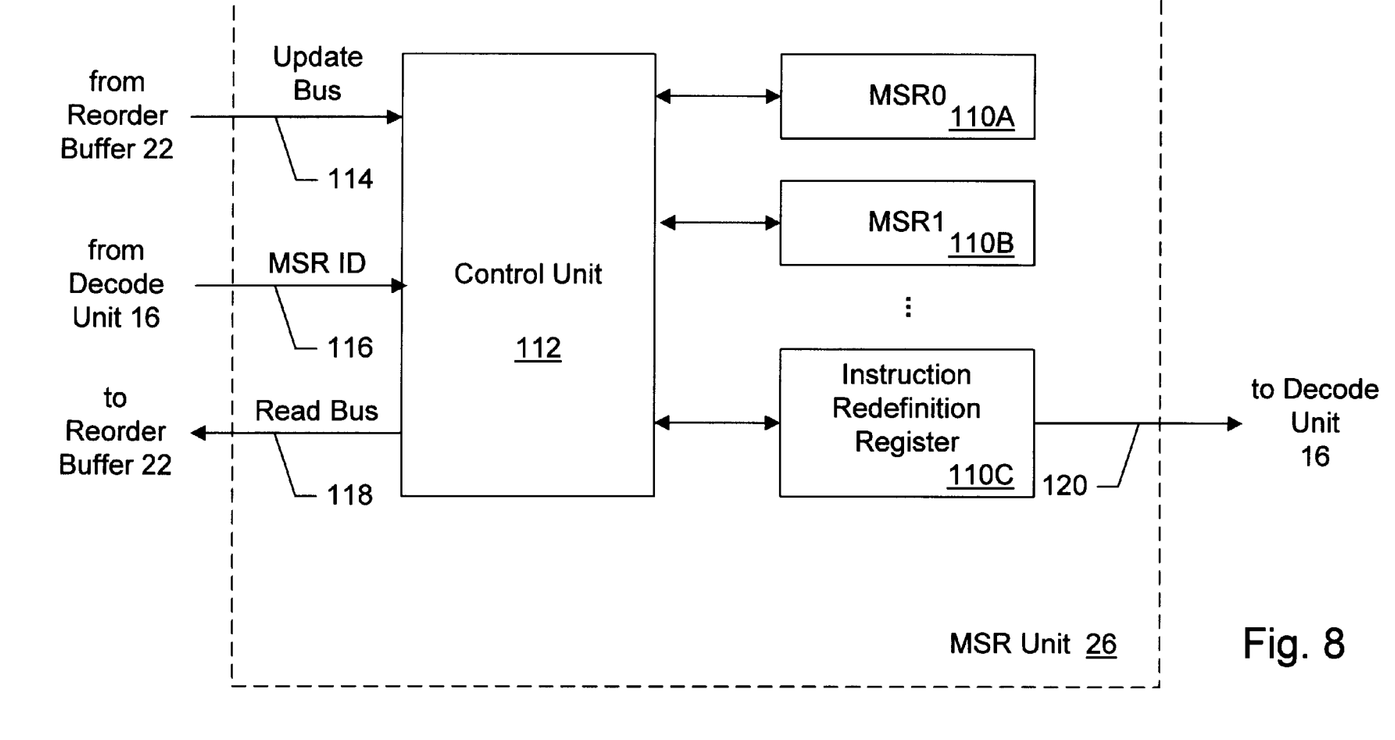
FIG. 8 is a block diagram of one embodiment of a model specific register (MSR) unit shown in FIG. 2.

As opposed to defining the stride instruction using a previously undefined opcode byte, the stride instruction may be implemented using instruction redefinition in accordance with the MSR unit shown in FIG. 8. MSR unit 26 includes a plurality of MSRs 110A, 110B, etc. One of MSRs 110 is shown as MSR 110C, which is labeled "instruction redefinition register" in FIG. 8. The instruction redefinition register is the MSR assigned to store instruction redefinition information. Although MSR 110C will be referred to herein as instruction redefinition register 110C, it is noted that instruction redefinition register 110C is an MSR. In other words, instruction redefinition register 110C is accessed using the read MSR and write MSR instructions (e.g. RDMSR and WRMSR in embodiments employing the x86 microprocessor architecture). One of the operands of the read MSR and write MSR instructions is a value (the MSR ID) which selects one of MSRs 110 for access. One value of the MSR ID selects MSR 110C.

A control unit 112 is shown in FIG. 8 as well. Control unit 112 is coupled to each of MSRs 110 for accessing and updating (i.e. reading and writing) MSRs 110 in response to read MSR and write MSR instructions. Control unit 112 is coupled to an update bus 114 from reorder buffer 22, an MSR ID bus 116 from decode unit 16, and a read bus 118 to reorder buffer 22.

Update bus 114 is used by reorder buffer 22 to convey an update value for an MSR, as well as an MSR ID identifying the MSR to be updated. Upon retirement of a write MSR instruction, reorder buffer 22 provides the update value generated according to execution of the write MSR instruction and the MSR ID provided as an operand of the write MSR instruction upon update bus 114. Control unit 112 updates the identified MSR 110 with the updated value.

When decode unit 16 decodes a read MSR instruction, decode unit 16 may detect the MSR ID and convey it to control unit 112 upon MSR ID bus 116. Control unit 112 accesses the identified MSR and provides the value stored in the identified MSR upon read bus 118 to reorder buffer 22. This process is similar to decode unit 16 conveying a register number to register file 24 and register file 24 providing the value stored therein to reorder buffer 22. Reorder buffer 22 either provides the value stored in the identified MSR or replaces the value with a tag or value stored in reorder buffer 22 if a dependency is detected therein.

Alternatively, the MSR ID may not be detectable by decode unit 16. For example, the RDMSR and WRMSR instructions defined by the x86 microprocessor architecture define the MSR ID as being stored in the ECX register. For such a case, MSR ID bus 116 may be coupled to execute units 18. Furthermore, read bus 118 may be part of result bus 30 in such a case.

It is noted that the write MSR instruction may be implemented as a serialized instruction (i.e. instructions prior to the write MSR instruction are completed before executing the write MSR instruction, and the write MSR instruction is completed before executing instructions subsequent to the write MSR instruction). If the write MSR instruction is serialized, then dependency checking for the MSR being read by the read MSR instruction may not be needed.

A write MSR instruction selecting instruction redefinition register 110C is used to enable instruction redefinition mode in microprocessor 10. The value stored into instruction redefinition register 110C determines which instructions are redefined as the stride instruction. The read MSR instruction may be used to examine the contents of instruction redefinition register 110C and thereby determine whether or not the stride instruction has been activated in place of an architected instruction.

According to one embodiment, a redefinition enable flag is stored in the status flags register employed by microprocessor 10. The redefinition enable flag is enabled to enable the use of the added instructions via instruction redefinition mode. The redefinition enable flag may be implicitly enabled by microprocessor 10 when a write MSR instruction is performed to instruction redefinition register 110C and at least one of the redefinable instructions is selected to be redefined. Similarly, the redefinition enable flag may be implicitly disabled when a write MSR instruction is executed which defines all redefinable instructions to perform their architecturally defined operations. Alternatively, application programs may be required to contain an explicit enable and disable of the redefinition enable flag.

A bus 120 is coupled between instruction redefinition register 110C and decode unit 16. Bus 120 conveys the values stored in instruction redefinition register 110C to decode unit 16. In this manner, decode unit 16 may determine which decoded instruction to produce upon decode of a redefinable instruction.

It is noted that a preselected instruction or instructions are defined as redefinable via instruction redefinition register 110C. It may be advantageous to select seldom-used instructions as redefinable instructions, since redefining a redefinable instruction as the stride instruction disables use of the architected operation corresponding to the redefinable instruction. For example, privileged instructions (which cannot be executed by an application program) and instructions which perform an operation which is seldom-used by application programs may be candidates for redefinable instructions.

Figure 9:
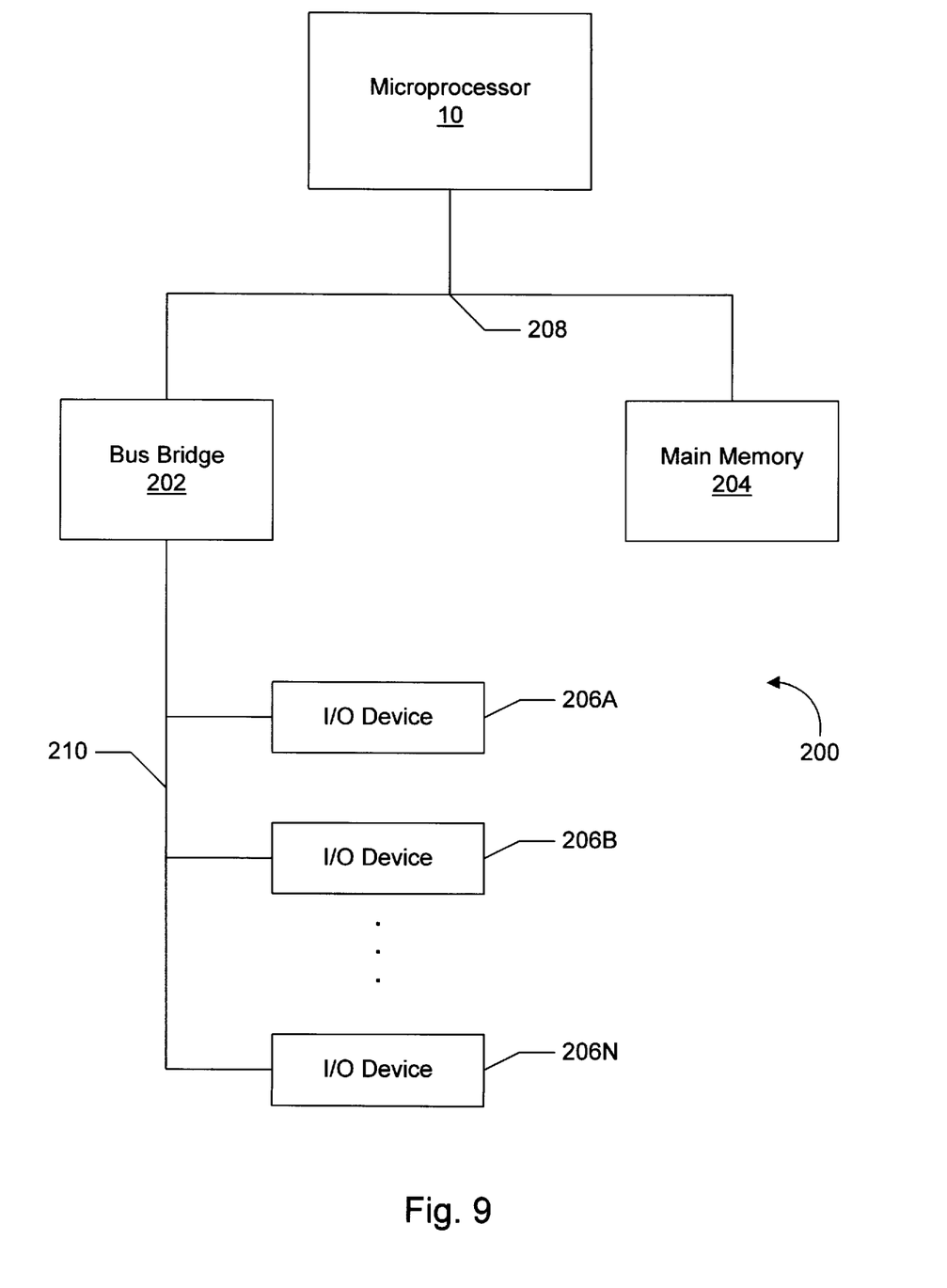
FIG. 9 is an exemplary computer system including the microprocessor shown in FIG. 2.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

In accordance with the above disclosure, a microprocessor is configured to execute a stride instruction. Upon executing the stride instruction, the microprocessor performs multiple load memory operations to addresses beginning at a base address operand of the stride instruction and then proceeding in a series of addresses separated from each other by a value of a stride operand of the stride instruction. The number of load memory operations is specified by a repetition count operand of the stride instruction. Advantageously, data may be fetched into the data cache of the microprocessor prior to executing a code sequence which exhibits a strided memory access pattern. Cache hit rates experienced by the code sequence may thereby increase, correspondingly increasing execution speed of the code sequence.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a first unit coupled to receive a stride instruction, wherein said first unit is configured to decode said stride instruction, said stride instruction having at least a base address operand, a stride operand, and a repetition count operand; and
   a second unit coupled to receive said stride instruction from said first unit, wherein said second unit is configured to execute a plurality of load memory operations in response to a particular execution of said stride instruction, and wherein a number of said plurality of load memory operations is specified by said repetition count operand of said stride instruction, and wherein said second unit is configured to generate a first address corresponding to a first load memory operation of said plurality of load memory operations from at least said base address operand, and wherein said second unit is configured to add said stride operand to said first address to generate a second address corresponding to a second load memory operation of said plurality of load memory operations.

2. The microprocessor as recited in claim 1 wherein said second unit is configured to generate addresses for each remaining one of said plurality of load memory operations by adding said stride operand to a previous address corresponding to a previous one of said plurality of load memory operations.

3. The microprocessor as recited in claim 1 wherein said second unit comprises a load/store unit.

4. The microprocessor as recited in claim 3 wherein said load/store unit is coupled to receive a second memory operation corresponding to a second instruction subsequent to said stride instruction, and wherein said load/store unit is configured to execute said second memory operation in parallel with said plurality of load memory operations corresponding to said stride instruction.

5. The microprocessor as recited in claim 1 wherein said second unit comprises a microcode unit.

6. The microprocessor as recited in claim 5 wherein said microcode unit is configured to parse said stride instruction into a sequence of load memory operations and add instructions, and wherein each of said load memory operations corresponds to a different one of said plurality of load memory operations, and wherein each one of said add instructions generates an address for one of said load memory operations by adding said stride operand to an address corresponding to a previous load memory operation.

7. The microprocessor as recited in claim 6 wherein said sequence comprises said load memory operations alternating with said add instructions.

8. The microprocessor as recited in claim 6 wherein a number of said load memory operations is equal to said repetition count.

9. The microprocessor as recited in claim 6 wherein a number of said add instructions is equal to said repetition count minus one.

10. The microprocessor as recited in claim 6 further comprising a load/store unit coupled to receive said load memory operations, wherein said load/store unit is configured to execute said load memory operations.

11. The microprocessor as recited in claim 10 further comprising an execute unit coupled to receive said add instructions, wherein said execute unit is configured to execute said add instructions.

12. The microprocessor as recited in claim 1 wherein said stride instruction excludes a destination operand.

13. A computer system comprising:
  a microprocessor including:
    a first unit coupled to receive a stride instruction, wherein said first unit is configured to decode said stride instruction, said stride instruction having at least a base address operand, a stride operand, and a repetition count operand; and
    a second unit coupled to receive said stride instruction from said first unit, wherein said second unit is configured to execute a plurality of load memory operations in response to a particular execution of said stride instruction, and wherein a number of said plurality of load memory operations is specified by said repetition count operand of said stride instruction, and wherein said second unit is configured to generate a first address corresponding to a first load memory operation of said plurality of load memory operations from at least said base address operand, and wherein said second unit is configured to add said stride operand to said first address to generate a second address corresponding to a second load memory operation of said plurality of load memory operations; and
  an input/output (I/O) device configured to communicate between said computer system and another computer system to which said I/O device is couplable.

14. The computer system as recited in claim 13 wherein said I/O device comprises a modem.

15. A method comprising:
  decoding a stride instruction in a microprocessor, said stride instruction including at least a base address operand, a stride operand, and a repetition count operand; and
  executing said stride instruction, wherein a particular execution of said stride instruction includes executing a plurality of load memory operations in said microprocessor, wherein a number of said plurality of load memory operations is specified by said repetition count operand, said executing said plurality of load memory operations comprising:
    generating a first address corresponding to a first load memory operation of said plurality of load memory operations from at least said base address operand; and
    adding said stride operand to said first address to generate a second address corresponding to a second load memory operation of said plurality of load memory operations.

16. The method as recited in claim 15 wherein said executing said plurality of load memory operations further comprises, for each remaining one of said plurality of load memory operations, adding said stride operand to a previous address corresponding to a previous one of said plurality of load memory operations.

17. The method as recited in claim 15 further comprising caching a cache line corresponding to each one of said plurality of memory operations.

18. The method as recited in claim 17 further comprising inhibiting update of any destination operands responsive to said stride instruction excluding a destination operand.

19. The method as recited in claim 15 further comprising executing a subsequent memory operation in parallel with said executing said plurality of memory operations.

* * * * *